June 12, 1934.  W. S. JOHNSON  1,962,716
WHEEL GAUGE
Filed March 16, 1932
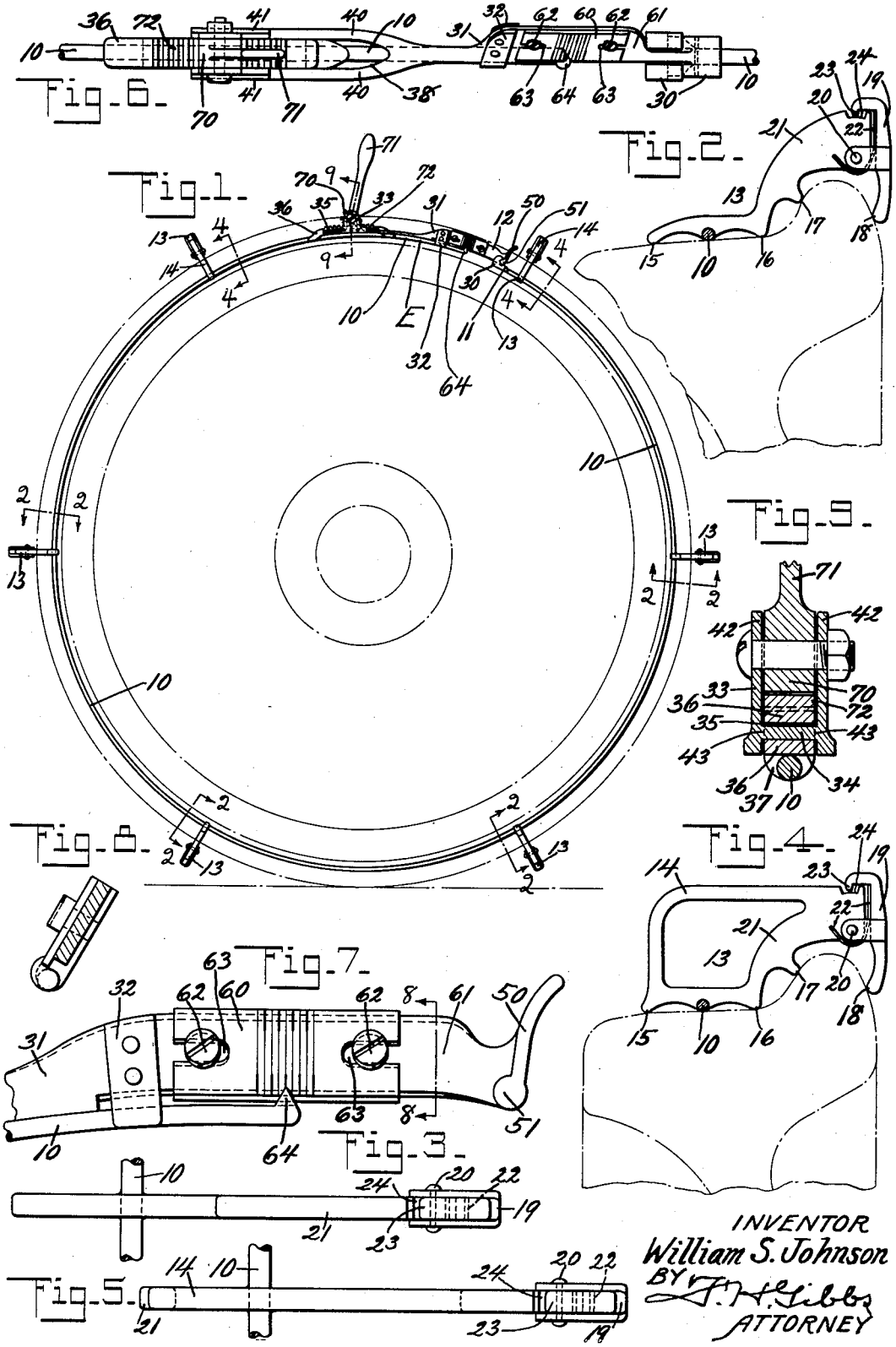
INVENTOR
William S. Johnson
BY J. H. Gibbs
ATTORNEY Patented June 12, 1934

1,962,716

UNITED STATES PATENT OFFICE 1,962,716

WHEEL GAUGE

William S. Johnson, Berwick, Pa., assignor to American Car and Foundry Company, New York, N. Y., a corporation of New Jersey Application March 16, 1932, Serial No. 599,146

12 Claims. (Cl. 33—179)

This invention relates to wheel circumference gauges and particularly to gauges for measuring the treads of flanged wheels such, for example, as are used on railway rolling stock.

So much flying sand is present in the cleaning room of a wheel foundry that gauges embodying encircling elements in the form of flat bands or tapes have been found unsuitable. Sand lodges under the tape and interferes with its proper seating on the wheel tread and the readings obtained are for this reason inaccurate. Also, the prior devices have lacked a positively acting means of tightening the encircling element at the proper gauging line around the tread.

The present invention has for one of its objects to provide a gauge adapted to fit closely and continuously around a wheel tread at the proper gauging line, irrespective of the conditions set forth above.

Another object of the invention is to provide a durable gauge of resilient material having provision for drawing the encircling element into tight and continuous contact with a wheel tread at all points thereon.

Still another object is to provide an inexpensive means to compensate for wear of the encircling element and permit ready readjustment of the indicating parts to agree with a master ring or other checking device.

Other objects will be in part obvious and in part pointed out particularly hereinafter.

The invention accordingly consists in the various features of construction, combinations of elements and arrangements of parts which will be exemplified by the construction hereinafter set forth and the scope of the application of which will be indicated in the appended claims.

In the drawing wherein is shown one of the various possible embodiments of the invention:

Figure 1 is a view of the improved gauge for flanged wheels shown in side elevation, the hub, rim, tread and flange of the wheel being indicated by dot and dash lines.

Fig. 2 is a view in cross section taken on the line 2—2 of Fig. 1.

Fig. 3 is a view in top plan of a fragment of the gauge shown in Fig. 2.

Fig. 4 is a view in cross section taken on the line 4—4 of Fig. 1.

Fig. 5 is a view in top plan of a fragment of the gauge as shown in Fig. 4.

Fig. 6 is a top plan view showing the separable ends of the encircling element and the slidably adjustable parts of one end.

Fig. 7 is a view in side elevation of the indexing device.

Fig. 8 is a view in cross section taken on the line 8—8 of Fig. 7, and

Fig. 9 is a view in cross section taken on the line 9—9 of Fig. 1.

Referring now more particularly to the drawing, the device comprises an encircling element E having a body 10 and separable ends 11 and 12. The body 10 is flexible and preferably resilient. As herein shown in a preferred form, it is of round spring wire of piano wire temper.

A number of frames 13 are connected to the spring wire body at spaced points. Preferably the connection is made by welding and the bottoms or inner portions of the frames are located so as not to prevent the spring wire from having contact with the wheel tread at the points of connection. As shown, the frames 13 except for the one adjacent each end of the body member, are of the type shown in Fig. 2 of the drawing. The end frames are of the type shown in Fig. 4, being provided with handles 14 by which the operator can manipulate the device. The wheel contacting points of the frames shown at 15, 16, 17 and 18 are, however, preferably uniform in all the frames. The points 15, 16 and 17 are designed to contact the wheel tread and the inner surface of the wheel flange. The point 18 is on a lever 19 pivoted at 20 to the frame body 21. This latter point is urged against the outer surface of the wheel flange by a spring 22. The lever has a range of movement limited by an inturned lip 23 arranged in a notch 24 in the body of the frame. By this construction each frame is equipped with a spring pressed dog yieldable over the flange as the gauge is applied circumferentially around the wheel.

The end 11 of the encircling element has affixed thereto an engaging member 30 of hook shape. The end 12 of the encircling element has a slidable member 31 inter-related with a portion of the spring wire body 10. These two parts are held in their slidable association by a clip 32 riveted to the slidable member 31 and partially surrounding the wire 10 (see Fig. 7) and a yoke 33 having a web 34 playing in a slot 35 of a rack member 36 which has its ends 37 welded to the wire 10.

The yoke 33 is formed by forking the slidable member 31 as indicated at 38 in Fig. 6 of the drawing. The two tines 40 of the fork extend upwardly at 41 defining ears 42 constituting the sides of the yoke 33. The web member 34 is separately formed and introduced to the slot 35 and is thereafter welded to the sides of the yoke at points 43.

The slidable member 31 has an engaging member 50 with oppositely extending cylindrical lugs 51 which are engaged by the bifurcated hook of engaging member 30. An indexing plate 60 is adjustably fixed on a portion of the slidable member 31. This portion is indicated at 61 and is disposed at an angle to the main body of the slidable member so that indicator readings may be taken when the device is viewed either toward the face of the wheel or toward the tread. The adjustable mounting of the plate 60 is effected by means of screws 62 threaded into the slidable member 31 through slots 63 in the plate. The spring wire 10 is formed with an indexing pointer 64 at its extremity, which pointer is cooperatively associated with the plate to register with index characters thereon.

The yoke 33 carries a rotatable pinion 70 movable by handle 71, the pinion being in mesh with teeth 72 of rack member 36.

In the operation of the gauge the encircling element, which normally stands open, is taken by the handles 14 and applied circumferentially around a flanged wheel, the spring pressed dogs yielding over the wheel flange. The hooked ends are engaged and the handle 71 is then rotated counter-clockwise as viewed in Fig. 1 of the drawing moving the pointer end 64 of the spring wire body toward the coupling point of the two ends of the encircling element. This pulls the wire tightly around the wheel tread causing it to contact in a straight line predetermined as the gauging line. The wire is definitely located in this position by the various contacting points of the frames 13. The reading is then observed from the relationship of the index pointer 64 with the index characters on plate 60.

Although the gauging wire is very hard it is subject to wear and to compensate for this the gauge is taken from time to time and applied to a master ring. If found in need of adjustment the screws 62 are loosened and the plate 60 shifted to proper relationship with the indexing pointer 64 whereupon the screws are tightened and the gauge is ready for continued use.

What is claimed is:

1. A gauge for flanged wheels comprising a band of spring wire having relatively slidable ends, and means including spring pressed members for locating said band in a predetermined position laterally of the wheel and substantially continuously around the tread thereof.

2. A gauge for flanged wheels comprising a band of spring wire having ends associated for relative sliding, and means comprising frames spaced around the band having spring pressed members adapted to engage the wheel flange for locating said band in a predetermined position laterally of the wheel tread.

3. A gauge for flanged wheels comprising a band of spring wire having ends associated for relative movement circumferentially, and means comprising frames having spring pressed members spaced around said band for locating said band along a predetermined gauging line laterally of the wheel tread.

4. A gauge for flanged wheels comprising a band of resilient round wire having separable ends, coupling elements for the ends of said band, one of said coupling elements being slidably attached to an end of said wire, means for relatively sliding the wire end and its attached coupling element, and spaced frames on said wire having spring pressed dogs engageable with the outer face of a wheel flange and having means adapted to contact with the inner face of the flange.

5. A gauge for flanged wheels comprising an encircling element having a body and separable ends, coupling elements on said ends, a member slidably mounted on said body comprising one of said ends, means for causing relative sliding movement between said body and said member, index means formed by a part of the body and a part of the member arranged in cooperative relationship, and wheel contacting means including spring pressed members spaced around the body to locate the encircling element relative to the wheel flange.

6. A gauge for flanged wheels comprising a flexible body having separable ends, a member slidably mounted on an end of said body, couplings on said end and on said member, means comprising handle operated gearing pivoted on said member for moving the latter relative to said body, index means formed by a part of the body and a part of the member, and wheel contacting means comprising frames having spring pressed dogs spaced around said body for locating the latter relative to the flange of the wheel.

7. In a circumferential wheel gauge, the combination with an encircling element having a flexible body and connectible ends, of a member slidably mounted on said body carrying pivotally mounted gear means for causing relative sliding movement between the member and said body, and adjustable index means comprising a plate slidably attached on said member and adapted to be adjusted to compensate for wear of the body in service.

8. A gauge for wheels comprising a flexible member adapted to surround the tread of a wheel, and means for adjusting said member to said tread comprising coupling means for the end portions of said member, said coupling means including a coupling member with which one end portion of said flexible member is detachably connected, said coupling member being provided with a scale and a pinion, and a rack member with which said pinion is engaged secured to the adjacent end portion of the flexible member at a point remote from the end thereof whereby said end is arranged for movement relative to the scale upon actuation of the pinion to cause relative movement of the coupling member and rack member.

9. A gauge for wheels comprising a flexible member adapted to surround a wheel tread, and means for adjusting said member to said tread comprising a coupling means for the end portions of said flexible member, said coupling means comprising a coupling member with which one end portion of the flexible member is detachably connected, said coupling member being provided with a scale and having a bifurcated end portion, a pinion journaled in said bifurcated end portion, a rack member permanently secured to the adjacent end portion of the flexible member at a point remote from the end thereof whereby said end is arranged adjacent said scale, said rack member extending between the bifurcations of said first named coupling member and being in engagement with said pinion, and a handle portion for actuating said pinion to move the ends of said flexible member toward and away from each other.

10. A gauge for wheels comprising a flexible member adapted to surround the tread of a wheel and provided with a connecting element at one end thereof, and a coupling element secured to the flexible member at a point removed from the opposite end of said member and with which said connecting element is detachably connected, said coupling element comprising a pair of relatively adjustable parts, one thereof having a scale cooperatively arranged with the opposite end of the flexible member, and means for adjusting the parts of said coupling element relative to each other.

11. A gauge for wheels comprising a flexible member adapted to surround the tread of a wheel and having a connecting element at one end thereof, a coupling element for connecting the end portions of said flexible member, said coupling element comprising a multi-part construction having one part thereof detachably engaged by the connecting element and the other part thereof permanently secured to the opposite end portion of the flexible member at a point removed from the end thereof, said other part including a rack, and a pinion carried by the first named part of said coupling element and engaging said rack.

12. A gauge for wheels comprising a flexible member adapted to surround a wheel tread, and a two-part coupling means connecting the end portions of said flexible member, one of said parts being detachably connected with one end of said flexible member and the other part being permanently secured to the opposite end portion of the flexible member at a point removed from its end, and rack and pinion means adjustably connecting the parts of said coupling means.

WILLIAM S. JOHNSON.